United States Patent
Liu

(10) Patent No.: US 9,827,662 B1
(45) Date of Patent: Nov. 28, 2017

(54) TOOL CABINET

(71) Applicant: Chia-Ming Liu, Douliou (TW)

(72) Inventor: Chia-Ming Liu, Douliou (TW)

(*) Notice: Subject to any disclaimer, the term of this patent is extended or adjusted under 35 U.S.C. 154(b) by 0 days.

(21) Appl. No.: 15/353,001

(22) Filed: Nov. 16, 2016

(30) Foreign Application Priority Data

Aug. 31, 2016 (CN) .................... 2016 2 1015361 U

(51) Int. Cl.
| | |
|---|---|
| A47B 46/00 | (2006.01) |
| B25H 1/16 | (2006.01) |
| A47B 83/04 | (2006.01) |
| A47B 9/04 | (2006.01) |
| A47B 9/20 | (2006.01) |
| A47B 31/00 | (2006.01) |
| B25H 1/12 | (2006.01) |
| B62B 3/02 | (2006.01) |

(52) U.S. Cl.
CPC ............... *B25H 1/16* (2013.01); *A47B 9/04* (2013.01); *A47B 9/20* (2013.01); *A47B 31/00* (2013.01); *A47B 83/045* (2013.01); *B25H 1/12* (2013.01); *B62B 3/02* (2013.01); *A47B 2031/003* (2013.01); *B62B 2202/48* (2013.01)

(58) Field of Classification Search
CPC .. A47B 9/04; A47B 9/20; A47B 13/00; A47B 37/00; A47B 31/00; A47B 45/00; A47B 46/00; A47B 83/00; A47B 83/045; A47B 17/02; B25H 1/12; B25H 1/16; B62B 3/02
USPC ......... 312/196, 223.2, 902, 306, 312, 317.3, 312/319.5; 108/59, 106, 147, 147.19
See application file for complete search history.

(56) References Cited

U.S. PATENT DOCUMENTS

| | | | | |
|---|---|---|---|---|
| 3,297,387 A * | 1/1967 | Parsons | ............... | A47B 29/00 112/217.1 |
| 4,627,364 A * | 12/1986 | Klein | ............... | A47B 9/04 108/147 |
| 4,740,044 A * | 4/1988 | Taylor | ............... | A47B 21/03 312/196 |
| 5,797,666 A * | 8/1998 | Park | ............... | A47B 21/0073 312/223.3 |
| 5,820,233 A * | 10/1998 | Hahn | ............... | A47F 3/005 312/114 |
| 6,213,575 B1 * | 4/2001 | Brin, Jr. | ............... | A47B 77/04 108/147 |
| 6,312,069 B1 * | 11/2001 | Weng | ............... | A47B 9/06 108/147 |
| 8,033,620 B2 * | 10/2011 | Retchloff | ............... | B25H 3/00 312/290 |
| 2002/0101139 A1 * | 8/2002 | Lee | ............... | A47B 21/0073 312/196 |

(Continued)

*Primary Examiner* — James O Hansen
(74) *Attorney, Agent, or Firm* — Trop Pruner & Hu, P.C.

(57) ABSTRACT

A tool cabinet includes a cabinet body having two guide rails, a working platform unit having a movable platform member and two hollow extension members, two lifting units each having a threaded rod, two driving units, and a control unit. The extension members are respectively slidable relative to the guide rails. The threaded rods respectively extend through the extension members and telescopically into the guide tubes. Each driving unit has a motor, and a speed reduction mechanism driven to rotate the threaded rod of a respective lifting unit. The control unit is connected to the motors for synchronizing movements of the motors.

4 Claims, 6 Drawing Sheets

(56) References Cited

U.S. PATENT DOCUMENTS

| | | | |
|---|---|---|---|
| 2005/0046315 A1* | 3/2005 | Doane | A47B 17/02 |
| | | | 312/196 |
| 2009/0127986 A1* | 5/2009 | Carelsen | A47B 21/0073 |
| | | | 312/204 |
| 2012/0025681 A1* | 2/2012 | Ton | A47B 46/00 |
| | | | 312/309 |
| 2013/0088131 A1* | 4/2013 | Messing | A47B 51/00 |
| | | | 312/247 |

* cited by examiner

TOOL CABINET

CROSS-REFERENCE TO RELATED APPLICATION

This application claims priority to Chinese Patent Application No. 201621015361.4, filed on Aug. 31, 2016.

FIELD

The disclosure relates to a tool cabinet, and more particularly to a tool cabinet that has a height-adjustable working platform.

BACKGROUND

Referring to FIG. 1, a conventional tool cabinet as disclosed in Chinese Patent No. 204868803U includes a cabinet body 1, a working platform unit 2 disposed on the cabinet body 1, two lifting units 3 respectively disposed at opposite sides of the cabinet body 1 and connected to the working platform unit 2, a linkage unit 4 interconnecting the lifting units 3, and a driving unit 5 disposed on the working platform unit 2. The cabinet body 1 includes two slide rails 101. The working platform unit 2 has two extension members 201 respectively and slidably inserted into the slide rails 101. Each of the lifting units 3 has a guide tube 301, a nut 302 that is disposed on a top end of the guide tube 301, a threaded rod 303 that is rotatably connected to the working platform unit 2, and that is threadedly connected to the nut 302, and a transmission bevel gear 304 that is disposed on a top end of the threaded rod 303. The linkage unit 4 includes a linkage rod 401, and two linkage bevel gears 402 that are respectively connected to opposite ends of the linkage rod 401, and that respectively mesh with the transmission bevel gears 304 of the lifting units 3. The driving unit 5 includes a motor 501, and a drive bevel gear 502 that is connected to the motor 501, and that meshes with the transmission bevel gear 304 of one of the lifting units 3.

When lifting or lowering the working platform unit 2, a user needs to start the motor 501 to drive rotation of the threaded rod 303 of the one of the lifting units 3 via the engagement between the drive bevel gear 502 and the transmission bevel gear 304 of the one of the lifting units 3. During the abovementioned rotation of the threaded rod 303, the transmission bevel gear 304 of the one of the lifting units 3 simultaneously drives rotation of the linkage rod 401 via the engagement between the transmission bevel gear 304 of the one of the lifting units 3 and a corresponding one of the linkage bevel gears 402, thereby driving rotation of the threaded rod 303 of the other one of the lifting units 3 (not shown in FIG. 1) via the engagement between the other one of the linkage bevel gears 402 and the transmission bevel gear 304 of the other one of the lifting units 3 (not shown in FIG. 1). For each lifting unit 3, since the rotation of the threaded rod 303 results in telescopic movement of the threaded rod 303 relative to the guide tube 301 via the engagement between the threaded rod 303 and the nut 302, the working platform unit 2 can eventually be moved upwardly and downwardly along the slide rails 101.

However, when in use, unlike the threaded rod 303 of the one of the lifting units 3, rotation of the threaded rod 303 of the other one of the lifting units 3 is driven via the linkage unit 4 instead of being directly driven by the driving unit 5, so that a delayed rotation of the threaded rod 303 of the other one of the lifting units 3 will occur (i.e., rotations of the threaded rods 303 of the lifting units 3 are not synchronous with each other), which results in twisting of the linkage rod 401 and unsmooth movement of the working platform unit 2. In addition, the defect of asynchronous rotation of the threaded rods 303 will be much more apparent as the linkage rod 401 becomes longer.

SUMMARY

Therefore, an object of the disclosure is to provide a tool cabinet that can alleviate at least one of the drawbacks of the prior art.

According to the disclosure, the tool cabinet includes a cabinet body, a plurality of drawers, a working platform unit, two lifting units, two driving units, and a control unit. The cabinet body includes a top cover, and two spaced-apart guide rails respectively disposed proximate to opposite ends of the top cover, and extending in a vertical direction. The drawers are movably disposed in the cabinet body, and are disposed under the top cover. The working platform unit includes a platform member and two hollow extension members. The platform member is disposed above the top cover. The extension members are respectively disposed on opposite ends of the platform member, and are connected respectively to the guide rails. Each of the extension members is slidable relative to a respective one of the guide rails. The working platform unit is movable relative to the cabinet body between a lowered position, where the platform member is proximate to the top cover, and a lifted position, where the platform member is distal from the top cover. Each of the lifting units includes a guide tube, a nut, and a threaded rod. The guide tube is disposed on the cabinet body and extends in a respective one of the guide rails. The nut is disposed on a top end of the guide tube. The threaded rod is connected rotatably to the working platform unit, extends through a respective one of the extension members and telescopically into a respective one of the guide tubes, and is threadedly connected to the nut. The driving units are disposed on the working platform unit.

Each of the driving units has a motor, and a speed reduction mechanism connected between the motor and the threaded rod of a respective one of the lifting units, and driven by the motor to rotate the threaded rod of the respective one of the lifting units. The control unit is disposed on the working platform unit, and is electrically connected to the motors of the driving units for synchronizing movements of the motors.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
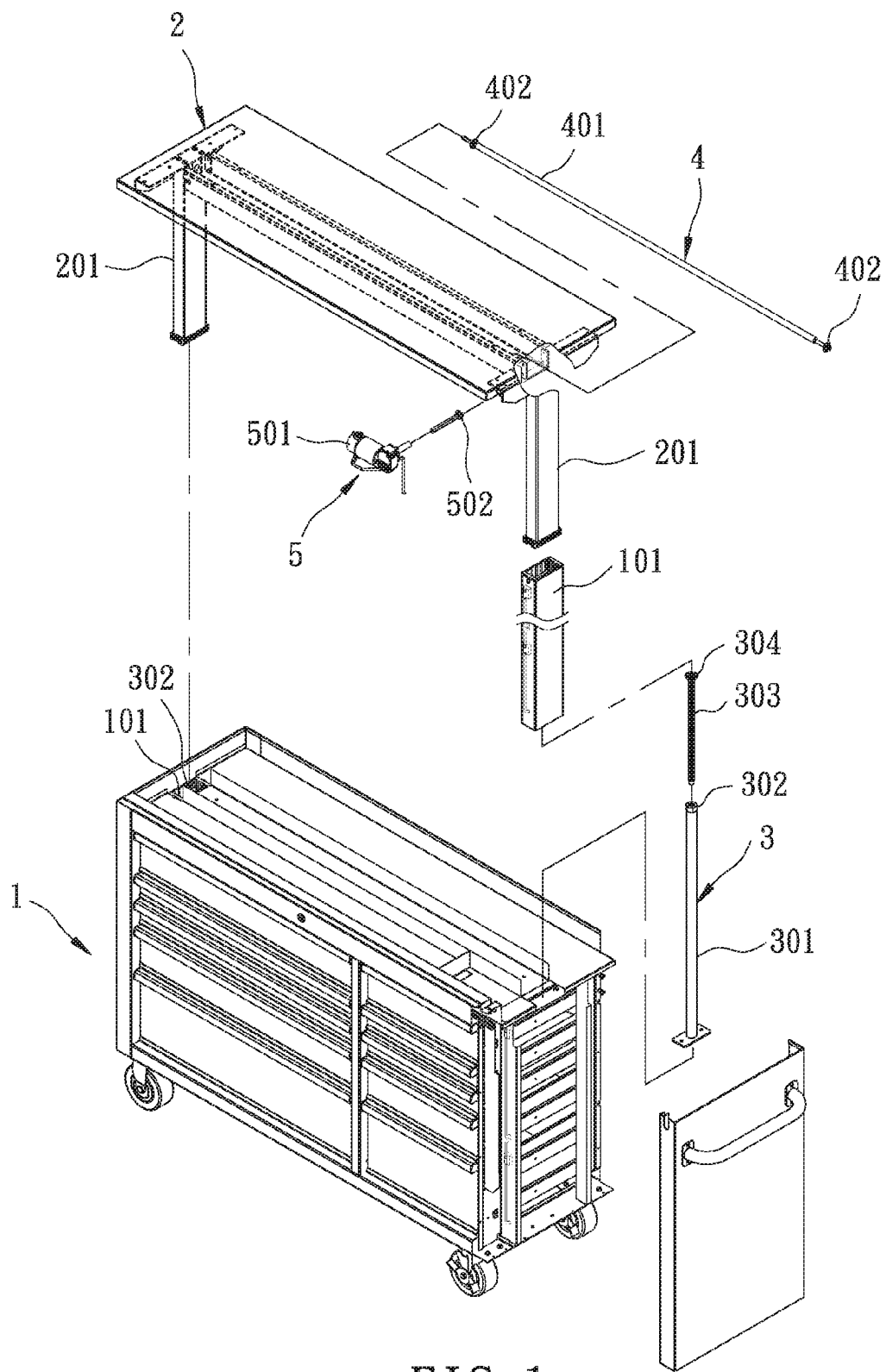
FIG. 1 is a fragmentary, partly exploded perspective view of a conventional tool cabinet.
Figure 2:
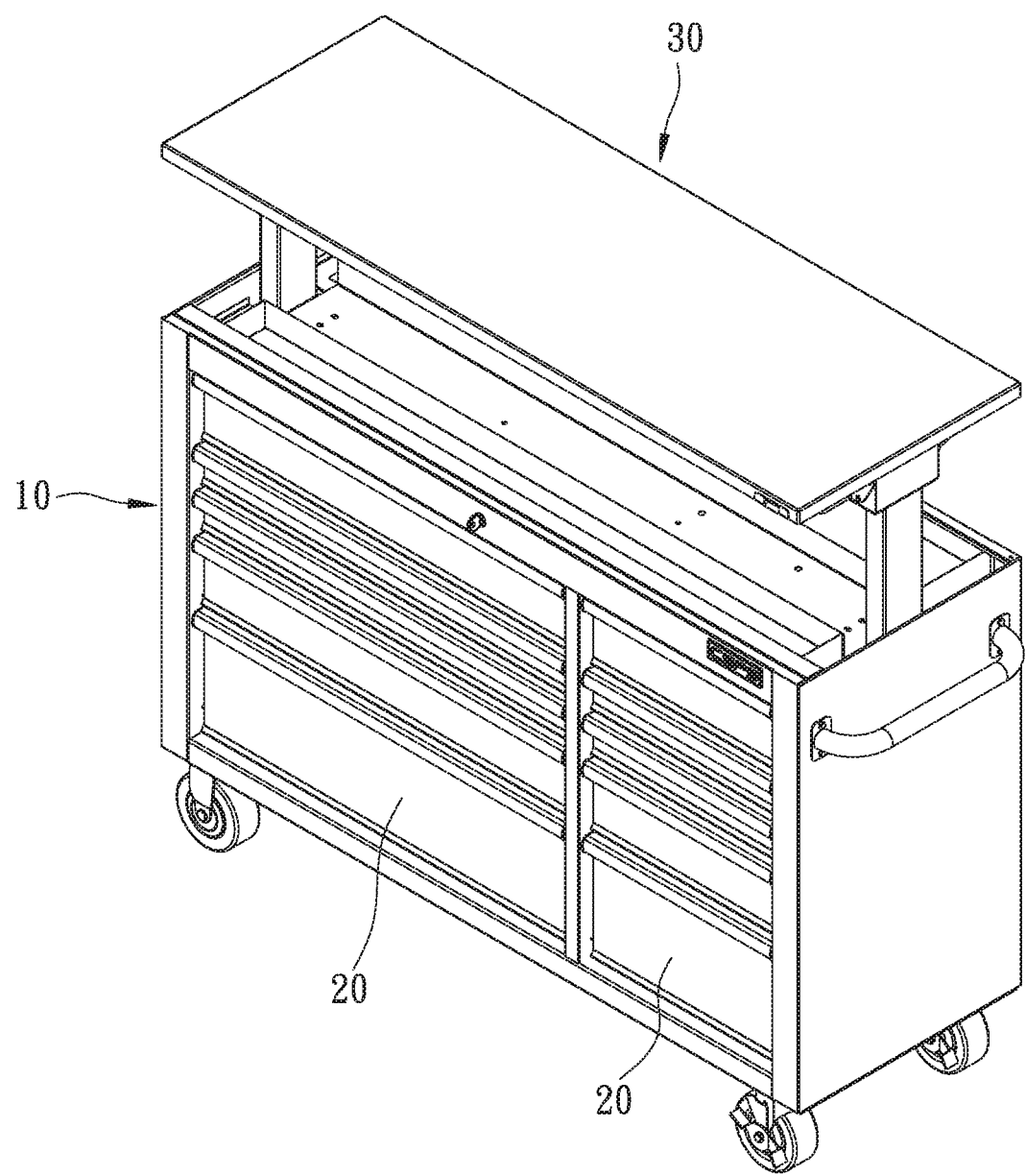
FIG. 2 is a perspective view of an embodiment of a tool cabinet according to the disclosure.
Figure 3:
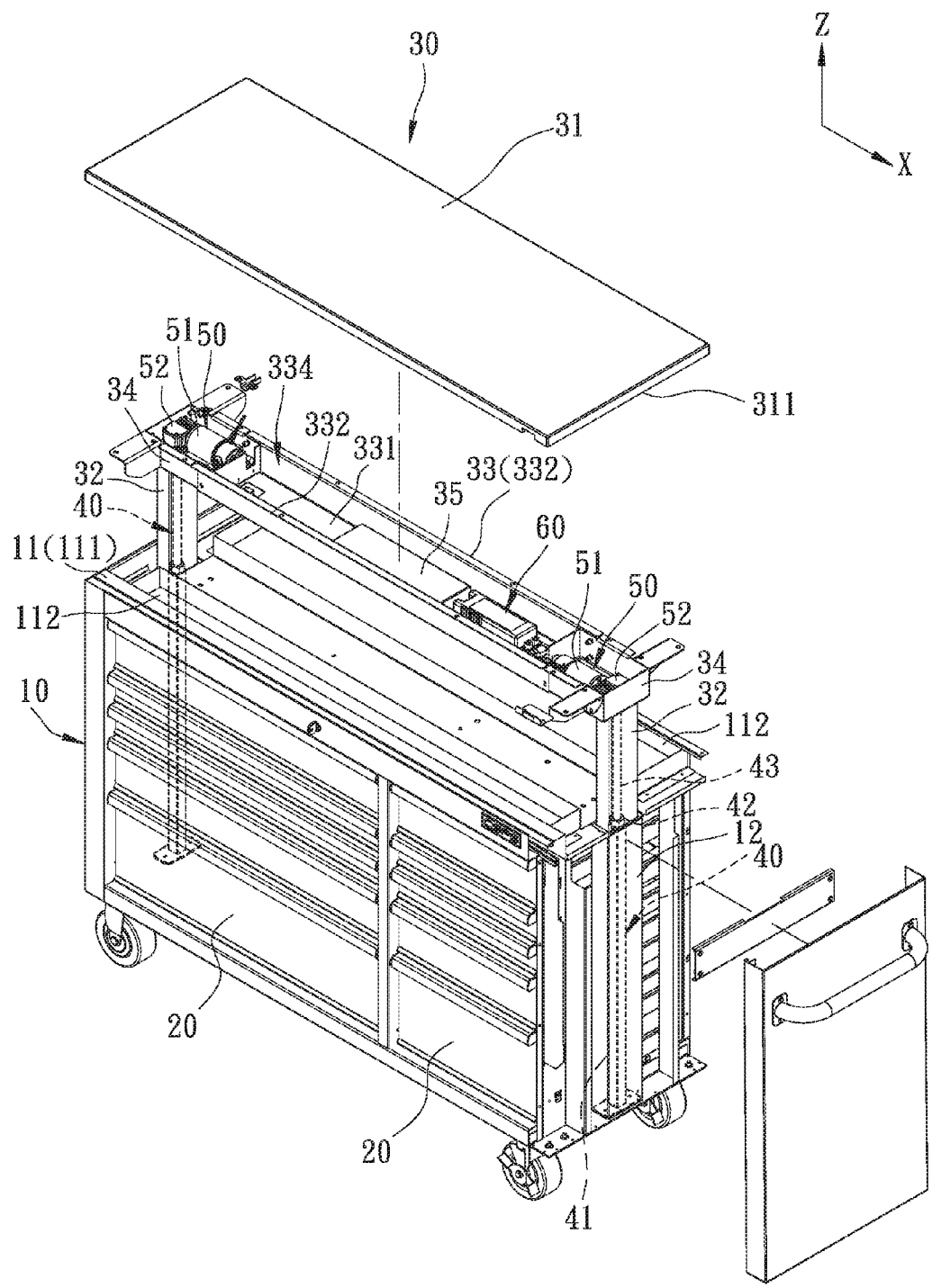
FIG. 3 is a partly exploded perspective view of the embodiment.

Referring to FIGS. 2 and 3, an embodiment of a tool cabinet according to the disclosure includes a cabinet body 10, a plurality of drawers 20, a working platform unit 30, two lifting units 40, two driving units 50, and a control unit 60.

Figure 4:
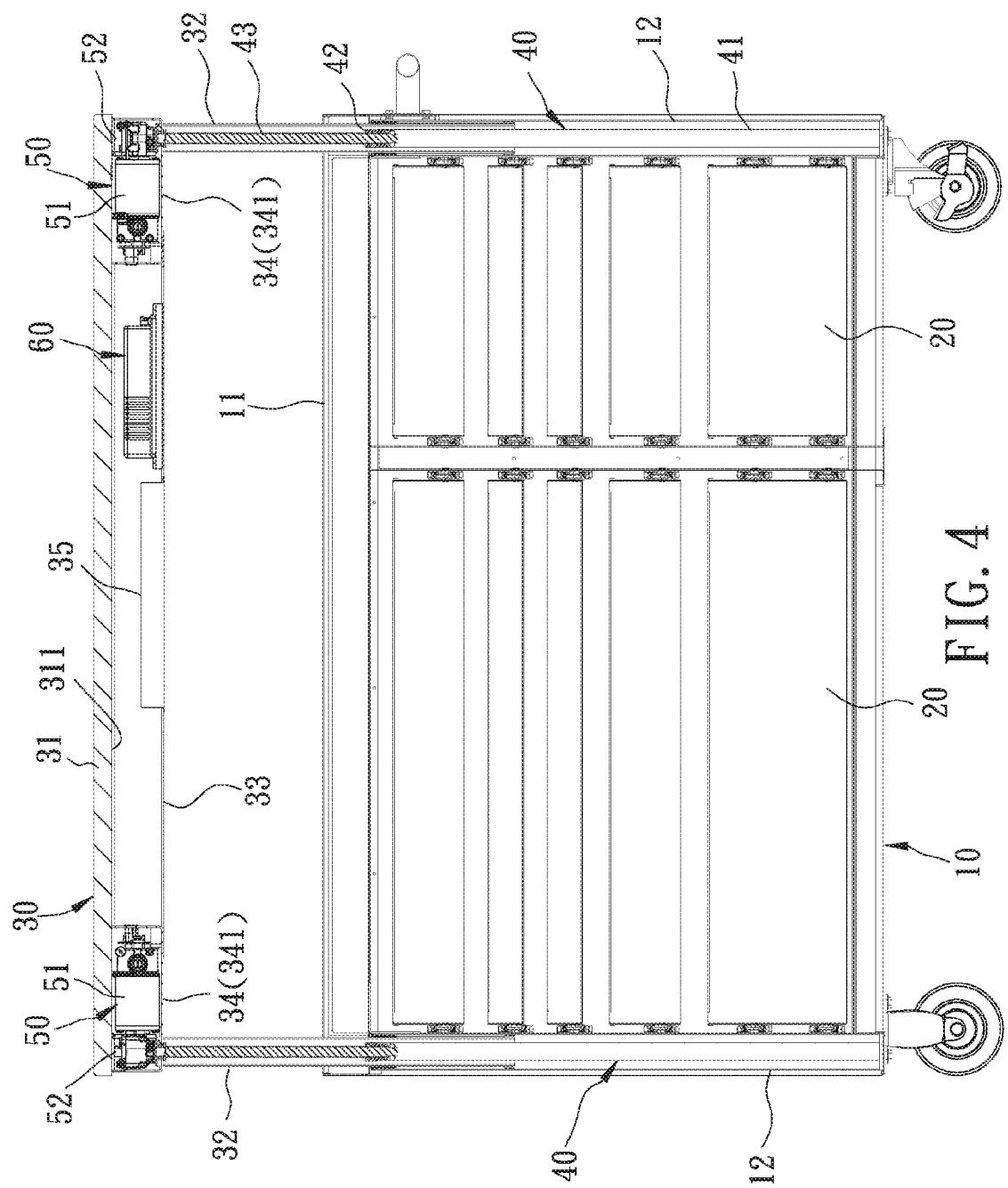
FIG. 4 is a sectional view of the embodiment, illustrating a working platform unit at a lifted position.
Figure 5:
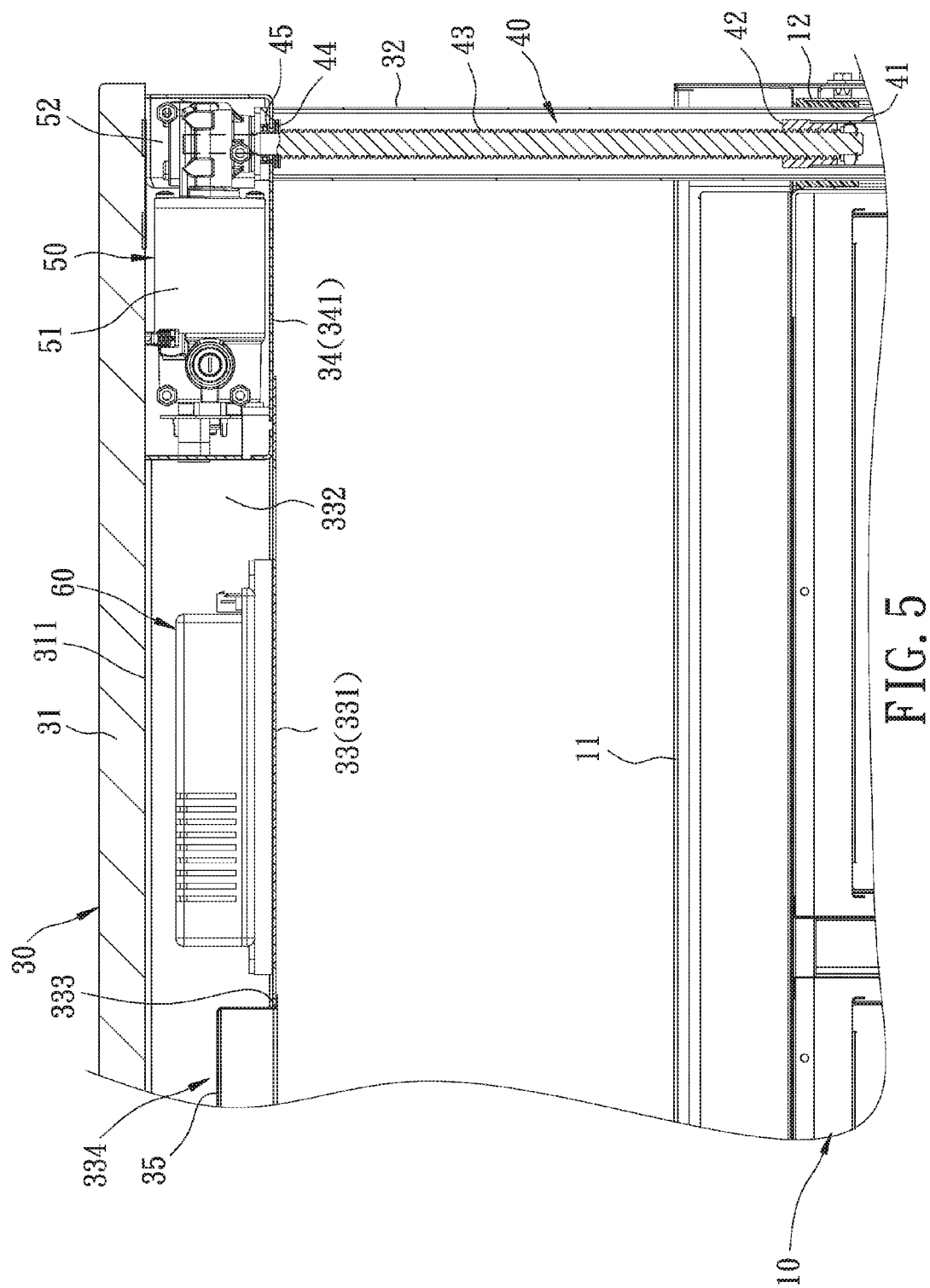
FIG. 5 is a fragmentary enlarged view of FIG. 4.

Referring to FIGS. 3 to 5, the cabinet body 10 includes a top cover 11, and two spaced-apart guide rails 12 respectively disposed proximate to opposite ends of the top cover 11, and extending in a vertical direction (Z). The top cover 11 has a top surface 111 formed with a plurality of storage chambers 112 for containing tools (not shown). The drawers 20 are movably disposed in the cabinet body 10, and are disposed under the top cover 11.

The working platform unit 30 includes a platform member 31, two hollow extension members 32, a hollow cross beam 33, two motor cases 34, and a light case 35. The platform member 31 is disposed above the top cover 11 of the cabinet body 10, and has a bottom surface 311. The extension members 32 are respectively disposed on opposite ends of the platform member 31. The cross beam 33 is disposed on the bottom surface 311 of the platform member 31, and has opposite longitudinal ends in a horizontal direction (X). Each of the motor cases 34 is disposed on the bottom surface 311 of the platform member 31, and connected between a respective one of the opposite longitudinal ends of the cross beam 33 and a respective one of the extension members 32. The light case 35 is disposed on the cross beam 33.

Figure 6:
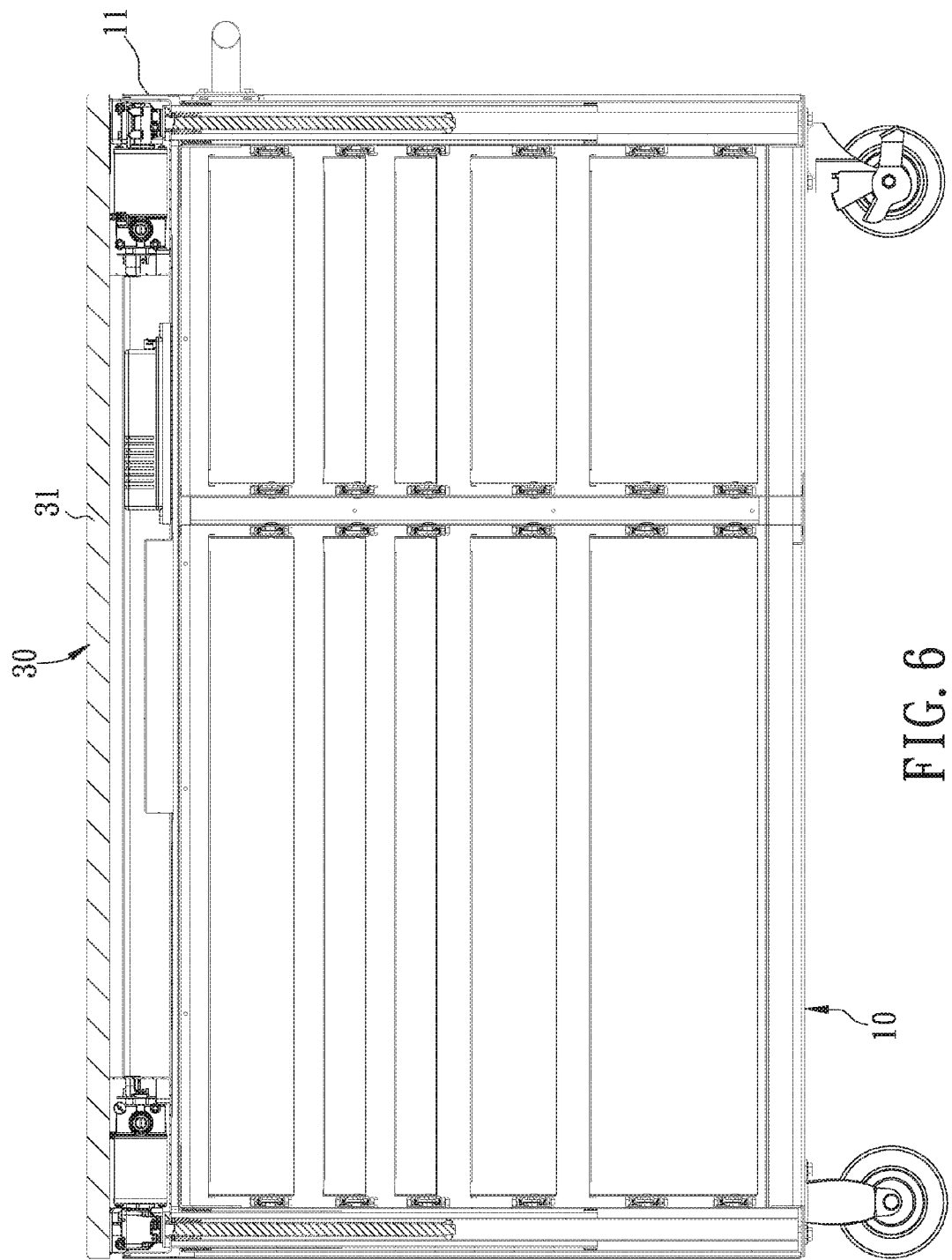
FIG. 6 is another sectional view of the embodiment, illustrating the working platform unit at a lowered position.

The extension members 32 are connected respectively to the guide rails 12 of the cabinet body 10, and each of the extension members 32 is slidable relative to a respective one of the guide rails 12. Therefore, the working platform unit 30 is movable relative to the cabinet body 10 between a lowered position (see FIG. 6), where the platform member 31 is proximate to the top cover 11, and a lifted position (see FIG. 4), where the platform member 31 is distal from the top cover 11.

The cross beam 33 has a beam bottom wall 331 having opposite edges that extend in the horizontal direction (X), and two connecting walls 332 extending respectively and upwardly from the opposite edges of the beam bottom wall 331, and cooperating with the beam bottom wall 331 to define a receiving space 334. The beam bottom wall 331 further has a through hole 333 communicating with the receiving space 334. The light case 35 is disposed in the receiving space 334 and engages the through hole 333 (see FIG. 5). The light case 35 may be used for receiving a light device (not shown). Each of the motor cases 34 has a case bottom wall 341.

Each of the lifting units 40 includes a guide tube 41 disposed on the cabinet body 10 and extending in a respective one of the guide rails 12, a nut 42 disposed on a top end of the guide tube 41, and a threaded rod 43 connected rotatably to the working platform unit 30, extending through a respective one of the extension members 32 and telescopically into a respective one of the guide tubes 41, and threadedly connected to the nut 42.

In this embodiment, the threaded rod 43 of each of the lifting units 40 extends rotatably into a respective one of the motor cases 34. Each of the lifting units 40 (only one lifting unit 40 is shown in FIG. 5) further includes a thrust bearing 44 sleeved on the threaded rod 43 and connected to a bottom surface of the case bottom wall 341 of the respective one of the motor cases 34, and a ball bearing 45 sleeved on the threaded rod 43 and connected to a top surface of the case bottom wall 341 of the respective one of the motor cases 34.

The driving units 50 are disposed on the working platform unit 30, and are disposed respectively in the motor cases 34. Each of the driving units 50 has a motor 51, and a speed reduction mechanism 52 that is connected between the motor 51 and the threaded rod 43 of a respective one of the lifting units 40, and that is driven by the motor 51 to rotate the threaded rod 43 of the respective one of the lifting units 40. In this embodiment, the speed reduction mechanism 52 is a speed reduction gear box. Each of the motor cases 34 defines an internal space that receives the motor 51 and the speed reduction mechanism 52 of a respective one of the driving units 50, and that communicates with the receiving space 334. The threaded rod 43 of each of the lifting units 40 extends rotatably through the case bottom wall 341 of the respective one of the motor cases 34.

The control unit 60 is disposed on the working platform unit 30, and is electrically connected to the motors 51 of the driving units 50 for synchronizing movements of the motors 51. The control unit 60 is disposed in the receiving space 334, and is disposed between the driving units 50.

In use, when lifting or lowering the working platform unit 30, a user needs to use the control unit 60 to start the motors 51 of the driving units 50, thereby synchronously driving movements of the threaded rods 43 of the lifting units 40 relative to the corresponding nuts 42. As a result, the working platform unit 30 can be smoothly moved along the guide rails 12 between the lowered position and the lifted position.

In view of the above description, the advantages of the tool cabinet can be summarized as follows. By virtue of the synchronous movements of the motors 51 driven by the control unit 60, the threaded rods 43 of the lifting units 40 can move synchronously. In comparison with the aforementioned conventional tool cabinet, the tool cabinet according to the present disclosure prevents delayed rotations of any one of the threaded rods 43 relative to the other one of the threaded rods 43, thereby ensuring a smooth movement of the working platform unit 30.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular future, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A tool cabinet comprising:
    a cabinet body that includes
        a top cover, and
        two spaced-apart guide rails respectively disposed proximate to opposite ends of said top cover, and extending in a vertical direction;
    a plurality of drawers that are movably disposed in said cabinet body, and that are disposed under said top cover;
    a working platform unit that includes a platform member disposed above said top cover, and two hollow extension members respectively disposed on opposite ends of said platform member, and connected respectively to said guide rails, each of said extension members being slidable relative to a respective one of said guide rails, said working platform unit being movable relative to said cabinet body between a lowered position, where said platform member is proximate to said top cover, and a lifted position, where said platform member is distal from said top cover;

two lifting units, each of which includes a guide tube disposed on said cabinet body and extending in a respective one of said guide rails, a nut disposed on a top end of said guide tube, and a threaded rod connected rotatably to said working platform unit, extending through a respective one of said extension members and telescopically into a respective one of said guide tubes, and threadedly connected to said nut;

two driving units that are disposed on said working platform unit, each of said driving units having a motor, and a speed reduction mechanism that is connected between said motor and said threaded rod of a respective one of said lifting units, and that is driven by said motor to rotate said threaded rod of the respective one of said lifting units; and a control unit that is disposed on said working platform unit, and that is electrically connected to said motors of said driving units for synchronizing movements of said motors;

wherein said platform member has a bottom surface;

wherein said working platform unit further includes a hollow cross beam disposed on said bottom surface, and having opposite longitudinal ends in a horizontal direction, and two motor cases disposed on said bottom surface, each of said motor cases being connected between a respective one of said opposite longitudinal ends of said cross beam and a respective one of said extension members, wherein said driving units are disposed respectively in said motor cases;

wherein said threaded rod of each of said lifting units extends rotatably into a respective one of said motor cases;

wherein each of said motor cases has a case bottom wall;

wherein said threaded rod of each of said lifting units extends rotatably through said case bottom wall of the respective one of said motor cases; and wherein each of said lifting units further includes a thrust bearing sleeved on said threaded rod and connected to a bottom surface of said case bottom wall of the respective one of said motor cases, and a ball bearing sleeved on said threaded rod and connected to a top surface of said case bottom wall of the respective one of said motor cases.

2. The tool cabinet as claimed in claim 1, wherein:

each of said motor cases defines an internal space that receives said motor and said speed reduction mechanism of a respective one of said driving units;

said cross beam has a beam bottom wall having opposite edges that extend in the horizontal direction, and two connecting walls extending respectively and upwardly from said opposite edges of said beam bottom wall, and cooperating with said beam bottom wall to define a receiving space that communicates with said internal spaces of said motor cases; and said control unit is disposed in said receiving space, and disposed between said driving units.

3. The tool cabinet as claimed in claim 2, wherein:

said beam bottom wall of said cross beam has a through hole communicating with said receiving space; and said working platform unit further includes a light case disposed in said receiving space and engaging said through hole.

4. The tool cabinet as claimed in claim 2, wherein said top cover of said cabinet body has a top surface formed with a plurality of storage chambers.

\* \* \* \* \*